United States Patent [19]

Kirsch et al.

[11] Patent Number: 5,298,546
[45] Date of Patent: Mar. 29, 1994

[54] THERMOPLASTIC MOLDING COMPOUNDS OF POLYALKYLENE TEREPHTHALATE, SPECIAL BARIUM SULFATE, PARTICULATE GRAFT POLYMERS AND, OPTIONALLY, REINFORCING MATERIALS

[75] Inventors: Jürgen Kirsch, Cologne; Karl-Erwin Piejko, Bergisch Gladbach; Christian Lindner, Cologne; Karsten-Josef Idel, Krefeld; Hans-Georg Gehrke, Odenthal, all of Fed. Rep. of Germany

[73] Assignee: Bayer Aktiengesellschaft, Leverkusen, Fed. Rep. of Germany

[21] Appl. No.: 580,073

[22] Filed: Sep. 10, 1990

[30] Foreign Application Priority Data

Sep. 23, 1989 [DE] Fed. Rep. of Germany ....... 3931772

[51] Int. Cl.$^5$ .................................................. C08K 3/30
[52] U.S. Cl. .................................... 524/423; 524/504; 524/513; 524/539; 524/601
[58] Field of Search .............. 524/423, 504, 513, 539, 524/601

[56] References Cited

U.S. PATENT DOCUMENTS

| | | | |
|---|---|---|---|
| 4,098,734 | 7/1978 | Lee | 524/424 |
| 4,409,345 | 10/1983 | Moteki et al. | 524/13 |
| 4,745,027 | 5/1988 | Maeda et al. | 428/372 |
| 4,803,231 | 2/1989 | Seinera et al. | 523/219 |
| 4,879,328 | 11/1989 | Karasawa et al. | 524/109 |

FOREIGN PATENT DOCUMENTS 230703 3/1987 European Pat. Off. .
335159 11/1989 European Pat. Off. .

OTHER PUBLICATIONS

Database WPIL, 88-297 407, Derwent Publications Ltd., & JP-A-63-218 769 (1988).
Database WPIL, 88-165 809, Derwent Publications Ltd., & JP-A-63-105 059 (1988).

*Primary Examiner*—Paul R. Michl
*Assistant Examiner*—Edward Cain
*Attorney, Agent, or Firm*—Connolly and Hutz

[57] ABSTRACT

Thermoplastic molding compounds of polyalkylene terephthalate, special barium sulfate, particulate graft polymers and, optionally, reinforcing materials are distinguished from known, elastomer-modified polyalkylene terephthalates, particularly polyethylene terephthalates, by improved heat resistance and toughness.

4 Claims, No Drawings

THERMOPLASTIC MOLDING COMPOUNDS OF POLYALKYLENE TEREPHTHALATE, SPECIAL BARIUM SULFATE, PARTICULATE GRAFT POLYMERS AND, OPTIONALLY, REINFORCING MATERIALS

This invention relates to thermoplastic molding compounds of polyalkylene terephthalate, special barium sulfate, particulate graft polymers and, optionally, reinforcing materials and to the use of the thermoplastic molding compounds for the production of moldings, semifinished products and films.

The elastomer-modified polyalkylene terephthalates, particularly polyethylene terephthalates, known at the present time (cf. for example EP 0 268 280, JP 60 149 654, JP 60 161 455, DE 3 603 185, JP 60 233 149, U.S. Pat. No. 4,647,619, JP 63 110 246, JP 61 241 353) are all attended by the disadvantage that they do not exhaust all the possibilities available, for example, in polyethylene terephthalate (PET) in regard to high heat resistance coupled with good toughness properties.

It has now been found that thermoplastic molding compounds of polyalkylene terephthalate, barium sulfate having a clearly defined particle size and/or an activated surface, particulate graft polymers and, optionally, reinforcing materials are distinguished by high heat resistance and good toughness.

Accordingly, the present invention relates to thermoplastic molding compounds of A) 1 to 99 parts by weight polyalkylene terephthalate, B1) 0.1 to 15 parts by weight barium sulfate having a chemoreactive surface produced by precipitation of barium ions with sulfate ions in aqueous medium in the presence of additional anions of water-soluble compounds which can be precipitated with barium ions and form sparingly soluble barium compounds, the chemoreactive barium sulfate obtained, optionally aftertreated with coupling agents, having particle sizes of <0.1 μm [80 to 5 $m^2/g$ (BET)], and/or B2) 0.1 to 15 parts by weight ultrafine barium sulfate produced by combining separate aqueous solutions respectively containing equivalent quantities of barium ions and sulfate ions and separating the precipitate; to produce precipitated barium sulfate having a primary particle size of <0.1 μm in a closed reactor, the aqueous solutions of the reactants are continuously divided up into large numbers of partial volumes which are combined to form discrete precipitation volumes having an average volume size of <1 μl and the resulting suspension of the precipitate is continuously removed from the reactor, C) 1 to 35 parts by weight of a particulate graft polymer of 35 to 95 parts by weight of an at least partly crosslinked rubber base of olefin, diene, acrylate and/or silicone rubbers grafted with 5 to 65 parts by weight vinyl monomers selected from styrenes, α-methyl styrenes, acrylonitrile, methacrylonitrile, $C_{1-8}$ alkyl (meth)acrylate, $C_{1-4}$ carboxylic acid vinyl ester, maleic anhydride, maleic acid imides, maleic acid semiesters, (meth)acrylates containing reactive groups in the alcohol radical or mixtures thereof and, optionally D) 0.1 to 50 parts by weight, based on components A), B) and C), of fillers and/or reinforcing materials and/or flame retardants.

Preferred thermoplastic molding compounds contain 94.9 to 15 parts by weight component A), 0.1 to 10 parts by weight components B1) and/or B2), 5 to 30 parts by weight component C) and, optionally, 0.1 to 45 parts by weight component D).

Particularly preferred thermoplastic molding compounds contain 20 to 94.9 parts by weight component A), 0.1 to 10 parts by weight components B1) and/or B2), 5 to 30 parts by weight component C) and, optionally, 0.1 to 40 parts by weight component D).

The above-mentioned parts by weight of components A) to D) should add up to 100 parts by weight.

The polyalkylene terephthalates used as component A) may be prepared in known manner from terephthalic acid (or reactive derivatives thereof) and aliphatic $C_{2-10}$ diols (Kunststoff-Handbuch, Vol. VIII, pages 695 et seq, Carl-Hanser-Verlag, München 1983).

Preferred polyalkylene terephthalates contain at least 90 mol-%, based on the dicarboxylic acid component, of terephthalic acid residues and at least 80 mol-% and preferably at least 90 mol-%, based on the diol component, of ethylene glycol and/or butane-1,4-diol residues.

In addition to terephthalic acid residues, the preferred polyalkylene terephthalates may contain up to 20 mol-% residues of other aromatic or cycloaliphatic $C_{8-14}$ dicarboxylic acids and/or aliphatic $C_{4-12}$ dicarboxylic acids, such as residues of phthalic acid, isophthalic acid, naphthalene-2,6-dicarboxylic acid, 4,4-diphenyl dicarboxylic acid, succinic acid, adipic acid, sebacic acid, cyclohexane diacetic acid.

In addition to ethylene glycol or butane-1,4-diol residues, the preferred polyalkylene terephthalates may contain up to 20 mol-% of other aliphatic $C_{3-21}$ diols or cycloaliphatic $C_{6-21}$ diols, for example residues of propane-1,3-diol, 2-ethylpropane-1,3-diol, neopentyl glycol, pentane-1,5-diol, hexane-1,6-diol, cyclohexane-1,4-dimethanol, 3-methylpentane-2,4-diol, 2-methylpentane-2,4-diol, 2,2,4-trimethylpentane-1,3-diol and -1,6-diol, 2-ethylhexane-1,3-diol, 2,2-diethylpropane-1,3-diol, hexane-2,5-diol, 1,4-di(B-hydroxyethoxy)-benzene, 2,2-bis-(4-hydroxycyclohexyl)-propane, 2,4-dihydroxy-1,1,3,3-tetramethyl cyclobutane, 2,2-bis-(3-B-hydroxyethoxyphenyl)-propane and 2,2-bis-(4-hydroxypropoxyphenyl)-propane (see DE-OSS 24 07 674, 24 07 776, 27 15 932).

The polyalkylene terephthalates may be branched by incorporation of relatively small quantities of trihydric or tetrahydric alcohols or tribasic or tetrabasic carboxylic acids of the type described, for example, in DE-OS 19 00 270 and U.S. Pat. No. 3,692,744. Examples of preferred branching agents are trimesic acid, trimellitic acid, trimethylol ethane and propane and pentaerythritol. It is advisable to use no more than 1 mol-% of the branching agent, based on the acid component.

Polyalkylene terephthalates which have been produced solely from terephthalic acid or reactive derivatives thereof (for example dialkyl esters) and ethylene glycol are particularly preferred.

The polyethylene terephthalates preferably used generally have an intrinsic viscosity of 0.4 to 1.5 dl/g and preferably 0.5 to 0.9 dl/g while the polybutylene terephthalates used generally have an intrinsic viscosity of 0.7 to 1.6 dl/g, preferably 0.8 to 1.3 dl/g and more preferably 0.8 to 1.05 dl/g, as measured in phenol/o-dichlorobenzene (1:1 parts by weight) at 25° C.

Component B1) of the thermoplastic molding compounds according to the invention may consist of barium sulfate having a chemoreactive surface produced by precipitation of barium ions with sulfate ions in aqueous medium in the presence of additional anions of water-soluble compounds which can be precipitated with barium ions and form sparingly soluble barium compounds, the chemoreactive barium sulfate obtained having particle sizes of <0.1 μm and preferably from 0.09 to 0.01 μm [80 to 5 m²/g and preferably 50 to 10 m²/g (BET)] (see DE-OS 3 718 277 and German patent application P 38 10 423.7).

The product obtained where barium sulfate is precipitated in the presence of corresponding concentrations of anions which form sparingly soluble compounds with barium ions contain the foreign ions either homogeneously distributed throughout the crystal or concentrated at the surface.

Depending on the charge density and molecule size of the anions or doping components, defects in the BaSO₄ crystal lattice are occupied or lattice sites are occupied in statistical distribution and the surface charge is shielded by long apolar molecule residues (hydrophobicizing).

Anions of water-soluble organic or inorganic compounds may be used in the process. In some cases, it may even be appropriate to use mixtures of these compounds.

To carry out the process, these additional components are best added to the aqueous solution containing the inorganic sulfate component, such as alkali sulfate. The additional component is used in a quantity of 0.1 to 50% by weight, based on the barium sulfate to be precipitated. The additional component is preferably used in a quantity of 1 to 10% by weight.

Suitable organic water-soluble compounds for the process are compounds from the group consisting of alkyl and aryl sulfonates, alkyl and aryl sulfates or alkyl and aryl phosphoric acid esters, the alkyl or aryl radical optionally being partly substituted by functional groups, or perfluorinated alkyl or aryl sulfonates. The following compounds for example are used in the process according to the invention: sodium dodecyl benzenesulfonate, sodium lauryl sulfate, sodium cetyl sulfate, phosphoric acid monoethyl monobenzyl ester, lithium perfluorooctane sulfonate.

Suitable compounds bearing alkyl or aryl radicals substituted by functional groups are those containing halogen, hydroxyl, amino, imino, mercapto, carboxyl or alkoxycarbonyl groups or a terminal double bond, for example 12-bromo-1-dodecanesulfonic acid, sodium 10-hydroxy-1-decanesulfonate, sodium carrageenan, sodium 10-mercapto-1-cetanesulfonate, sodium 16-cetene(1) sulfate.

In the process for the production of chemoreactive barium sulfate, inorganic compounds from the group consisting of thiosulfate, silicate, fluoride, fluorosilicate, monofluorophosphate or tungstate are used- as anions of water-soluble inorganic compounds (other inorganic compounds than sulfates). Suitable compounds are, for example, sodium thiosulfate (Na₂S₂O₃.5 H₂O), sodium metasilicate (Na₂SiO₃), sodium fluoride (NaF), lithium hexafluorosilicate (Li₂(SiF₆).2 H₂O), sodium fluorophosphate (Na₂PO₃F) and sodium polytungstate (3 Na₂WO₄.9 WO₃.H₂O).

The chemoreactive barium pigments produced by the process may be subjected to an aftertreatment suitable for the particular application envisaged.

If acidic or esterifiable hydroxyl groups, such as

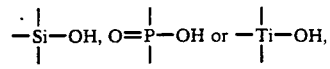

are applied to the barium sulfate surface, for example by the doping components, or if, in addition to the (SO₄)²⁻ anions, other chemically reactable groups, such as S²⁻, SH or F⁻, introduced by co-precipitation are present in the crystallite surface, the BaSO₄ pigment may be aftertreated with suitable coupling agents for the particular application. Organofunctional alkoxysilanes, such as vinyl trimethoxysilane, are generally used as coupling agents. However, alkoxy titanates, zirconates or aluminates are also used. The coupling agent is applied by methods known per se. It may be applied to the pigment in solution in a solvent, the solvent being removed and the solid dried. Alternatively, the coupling agent, where it is a liquid, may be applied by spraying to the pigment powder in a moving mixed bed.

The ultrafine barium sulfate to be added as component B2) to the thermoplastic molding compound is prepared by combining separate aqueous solutions respectively containing equivalent quantities of barium and sulfate ions and separating the precipitate; to produce precipitated barium sulfate having a primary particle size of <1 μm in a closed reactor, the aqueous solutions of the reactants are continuously divided up into large numbers of partial volumes which are combined to form discrete precipitation volumes having an average volume size of <1 μl and the resulting suspension of the precipitate is continuously removed from the reactor. The aqueous solution of the sulfate ion may also contain another anion of a water-soluble inorganic or organic compound which forms sparingly soluble barium compounds (cf. DE-OS 3 703 377 and German patent application P 3 810 423.7).

In the process, therefore, small partial volumes of the reaction solutions are combined in large numbers, for example more than 10⁶ per second, and precipitation is brought about quickly and completely in a reaction volume having an average volume size of <1 μl.

To carry out the process, the respective aqueous solutions of the reactants are brought together continuously and rapidly in the form of droplets having an average size of <0.5 μl and combined in a precipitation volume having an average volume size of <1 μl.

In another embodiment of the process, the aqueous solution of one reactant is continuously converted into droplets (<0.5 μl in size) and the droplets thus formed are continuously introduced into a flowing film of the aqueous solution of the other reactant.

In other words, droplets of the aqueous solution of one reactant are combined at high speed with droplets of the other reactant or droplets of the aqueous solution of one reactant are projected at high speed into a flowing film of the aqueous solution of the other reactant, for example the droplets of an aqueous barium chloride solution are projected into a flowing film of an aqueous sodium sulfate solution.

The process is best carried out in a closed vertical, cylindrical reactor. The head of the reactor is equipped in known manner with means or devices for dividing aqueous component solutions into very fine droplets and with means for producing a flowing film of aqueous component solutions. At its base, the reactor is best conical in shape and provided with means for removing the reaction mixture or the precipitate suspension.

The reaction solution may be converted into droplets in the head part of the cylindrical reactor by atomization of the solution under pressure, for example through nozzles, or by the application of centrifugal force to the solution, for example using spray disks. The droplets are <0.5 μl and preferably from 0.001 to 0.25 μl in size. The flowing film on the inner wall of the reactor is produced in a thickness of 1 to 10 mm.

The droplet streams of the aqueous solutions may be directed diametrically or at an angle to one another. In addition, however, the droplet streams may also be moved parallel to one another in the same direction through the reactor and made to penetrate into, and precipitate, one another.

The film of the precipitate suspension flowing down the wall of the reactor is collected in the lower part of the reactor, discharged from the reactor by a metering unit and worked up into the solid, such as ultrafine barium sulfate having a primary particle size below 0.1 μ and preferably from 0.09 to 0.01 μ [BET surface: 80 to 5 m²/g, preferably 40 to 10 m²/g].

The barium sulfate with the chemoreactive surface and/or the ultrafine barium sulfate may be added to and mixed with the other components of the molding compound by standard methods. However, the barium sulfate is preferably added to component A). For example, the barium sulfate may be added to the polyethylene terephthalate in the form of a suspension in the corresponding diol before the beginning of the polyester-forming reaction. However, the barium sulfate may also be introduced into the melt compounding process in the form of a highly concentrated compound.

The particulate graft polymers used as component C) consist of 35 to 95 parts by weight and preferably of 50 to 90 parts by weight an at least partly crosslinked rubber base of olefin, diene, acrylate and/or silicone rubbers grafted with 5 to 65 parts by weight and preferably with 10 to 50 parts by weight vinyl monomers selected from styrenes, α-methyl styrenes, acrylonitrile, methacrylonitrile, $C_{1-8}$ alkyl (meth)acrylate, $C_{1-4}$ carboxylic acid vinyl ester, maleic anhydride, maleic acid imides, maleic acid semiesters, (meth)acrylates containing reactive groups in the alcohol radical, such as hydroxy, carboxy or epoxy groups (such as for example hydroxyethyl methacrylate or glycidyl methacrylate) or mixtures thereof having average particle diameters ($d_{50}$ values) of 60 to 800 nm and preferably 80 to 600 nm.

The rubber bases for the production of component C) are at least partly crosslinked and have gel contents of >30% by weight, preferably from 60 to 99% by weight and more preferably from 75 to 95% by weight.

The gel content of the rubber base is determined at 25° C. in dimethyl formamide (M. Hoffmann, H. Kramer, R. Kuhn, Polymeranalytik I und II, Georg-Thieme-Verlag, Stuttgart 1977).

The olefin rubbers for the production of component C) are copolymers of ethylene, for example with propylene or relatively long-chain olefins, acrylonitrile, vinyl acetate, $C_{1-8}$ (meth)acrylates, carbon monoxide, diolefins or mixtures thereof.

Suitable diene rubber bases for the production of C) are homo- and/or copolymers of 1,3-butadiene and/or isoprene which may contain up to 30% by weight copolymerized monomers of the styrene, $C_{1-8}$ (meth)acrylate or acrylonitrile type. Homopolymers of 1,3-butadiene are preferred.

The acrylate rubbers used as (co)polymers of alkyl acrylates which may contain up to 30% by weight other copolymerized monomers. Preferred polymerizable acrylates include $C_{1-8}$ alkyl acrylates, for example methyl, ethyl, butyl, octyl and 2-ethyl hexyl acrylate, and haloalkyl acrylates, preferably halo-$C_{1-8}$-alkyl acrylates, such as chloroethyl acrylate. They may be used individually or in admixture.

Monomers containing more than one polymerizable double bond may be copolymerized for crosslinking. Preferred examples of crosslinking monomers are esters of unsaturated monocarboxylic acids containing 3 to 8 C atoms and saturated monohydric alcohols containing 3 to 12 C atoms or saturated polyols containing 2 to 4 OH groups and 2 to 20 C atoms, such as ethylene glycol dimethacrylate, allyl methacrylate; polyunsaturated heterocyclic compounds, such as trivinyl and triallyl cyanurate and isocyanurate, triacryloyl-s-triazines, particularly triallyl cyanurate; polyfunctional vinyl compounds, such as di- and trivinylbenzene, and also trialkyl phosphate and diallyl phthalate.

Preferred crosslinking monomers are allyl methacrylate, ethylene glycol dimethacrylate, diallyl phthalate and heterocyclic compounds containing at least three ethylenically unsaturated groups.

Particularly preferred crosslinking monomers are the cyclic monomers triallyl cyanurate, triallyl isocyanurate, trivinyl cyanurate, triacryloyl hexahydro-s-triazine and triallylbenzenes.

The crosslinking monomers are preferably used in a quantity of 0.02 to 5% by weight and more preferably in a quantity of 0.05 to 2% by weight, based on the rubber base.

In the case of cyclic crosslinking monomers containing at least three ethylenically unsaturated groups, it is of advantage to limit the quantity to 1% by weight of the rubber base.

Preferred "other" polymerizable, ethylenically unsaturated monomers which may optionally be used in addition to the acrylates for the production of the acrylate rubber base are, for example, acrylonitrile, styrene, α-methyl styrene, acrylamides, vinyl-$C_{1-6}$ alkyl ethers, butadiene, isoprene.

The acrylate rubber bases may also be products which contain a crosslinked diene rubber of one or more conjugated dienes, such as polybutadiene, or a copolymer of a conjugated diene with an ethylenically unsaturated monomer, such as styrene and/or acrylonitrile, as core. The percentage content of the polydiene core in the acrylate rubber base may be from 0.1 to 80% by weight and preferably from 10 to 50% by weight, based on the acrylate rubber base.

Particularly preferred rubber bases for the graft polymers C) based on polyacrylates are summarized in the following:

1. acrylate polymers and copolymers without a diene rubber core and
2. acrylate polymers and copolymers containing a diene rubber core.

The silicone rubber bases are crosslinked silicone rubbers and contain units corresponding to formulae (I) to (IV)

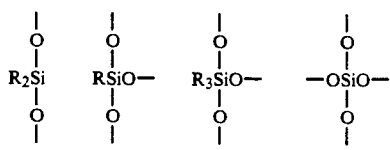

(R₂SiO); (RSiO₃/₂); (R₃SiO₁) and (SiO₂), (I)        (II)       (III)         (IV)

in which

R is a monohydric organic radical.

Monofunctional organic radicals in the present context are $C_{1-40}$ organic radicals, for example alkyl groups, preferably $C_{1-10}$ alkyl, aryl groups, preferably $C_{6-24}$ aryl, alkylaryl groups, preferably $C_{7-30}$ alkylaryl, arylalkyl groups, preferably $C_{7-30}$ aralkyl, $C_{1-20}$ alkoxy, $C_{1-20}$ thioalkyl and unsaturated $C_{2-20}$ organic radicals.

Methyl, ethyl, tert.-butyl, phenyl, methylphenyl, bisphenyl, phenylmethyl are particularly preferred. $C_{1-10}$ alkoxy radicals, groups which can be attacked by radicals, such as vinyl or γ-mercaptopropyl radicals, are also mentioned.

At least 80% of all the radicals R are preferably methyl, combinations of methyl and ethyl being particularly preferred.

For every 100 mol units of the formula $R_2SiO$, there are preferably 0 to 10 mol units of the formula $RSiO_{3/2}$, 0 to 1.5 mol units $R_3SiO_{1/2}$, and 0 to 3 mol units of the formula $SiO_2$.

Preferred silicone rubber bases contain incorporated units of groups which can be attacked by radicals. They are capable of radical addition or transfer reactions. Groups such as these are preferably vinyl, allyl, chlorine, mercapto groups, preferably in quantities of 2 to 10 mol-% based on the radicals R.

The silicone rubber bases may also represent a core/shell system with a silicone rubber core and a shell of crosslinked alkyl acrylate rubber.

This shell is, in particular, a crosslinked (graft) polymer (predominantly graft polymer) of alkyl acrylates, optionally in admixture with up to 40% by weight other vinyl monomers. Suitable polymerizable acrylates include $C_{1-8}$ alkyl acrylates, for example methyl, ethyl, butyl, octyl and 2-ethylhexyl acrylate and also haloalkyl acrylates, preferably $C_{1-8}$ haloalkyl acrylates, such as chloroethyl acrylate.

They may be used individually or in admixture; in the case of a mixture, at least one alkyl ester should be present in the mixture. For crosslinking, monomers having a functionality of two or more ("polyfunctional" monomers) are polymerized.

Examples are esters of unsaturated carboxylic acids with a polyol (preferably 2 to 20 carbon atoms in the ester group), such as ethyl glycol dimethacrylate, esters of a polybasic carboxylic acid with an unsaturated alcohol (preferably 8 to 30 carbon atoms in the ester radical), such as triallyl cyanurate, triallyl isocyanurate; divinyl compounds, such as divinylbenzene; esters of unsaturated carboxylic acids with unsaturated alcohols (preferably 6 to 12 carbon atoms in the ester radical), such as allyl methacrylate; phosphoric acid esters, for example triallyl phosphate, and 1,3,5-triacryloyl hexahydro-s-triazine, alkylene-bis-acrylamides, etc.

Particularly preferred polyfunctional monomers are triallyl cyanurate and triallyl isocyanurate. The quantity of polyfunctional monomer used for crosslinking is preferably from 0.05 to 5.0% by weight, based on the shell.

The silicone rubber core is converted into an emulsion or is prepared in emulsion. For example, a long-chain, OH-terminated silicone oil is polymerized by emulsion polymerization (for example U.S. Pat. No. 2,891,910, GB-A-1,024,024) in the presence of an alkyl benzenesulfonic acid or n-alkylsulfonic acid, optionally in the presence of other emulsifiers and co-emulsifiers. On completion of polymerization, the acid is neutralized. The concentration of emulsifier may be kept low. The emulsion prepared contains few troublesome foreign molecules (for example from the catalyst) in the end product.

In general, silicone oils prepared by emulsion polymerization in the presence of nonionic co-emulsifiers have lower molecular weights than those where no co-emulsifier was used. The molecular weight of the OH-terminated silicone oil formed during the emulsion polymerization is also controlled, for example, through the temperature prevailing during establishment of the equilibrium between siloxane, water and the silane oil initially formed by ring opening of the siloxane.

Radical-attackable groups may be incorporated in the preferred silicone copolymer by reaction in the presence of suitable siloxane oligomers. Suitable starting oligomers are, for example, tetramethyl tetravinyl cyclotetrasiloxane, γ-mercaptopropyl methyldimethoxysilane or its hydrolyzate.

These functional oligomers may be added to the base oligomer for copolymerization, octamethyl cyclotetrasiloxane, in the desired quantity.

Relatively long chain alkyl radicals R, such as for example ethyl, propyl or the like, and phenyl groups may also be similarly incorporated.

The silicone rubber bases may be crosslinked, for example, by reaction of the vinyl and mercaptopropyl groups preferably used with one another during the emulsion polymerization of the silicone constituents so that there is no need for an external crosslinking agent to be added. A crosslinking silane may optionally be added to increase the degree of crosslinking of the silicone rubber.

Branches or crosslinks may be incorporated by addition of, for example, tetraethoxysilane or a silane corresponding to the general formula $RSiX_3$, where X is a hydrolyzable group (for example an alkoxy radical). R has the meaning previously defined. R is preferably methyl, phenyl. Besides tetraethoxysilane, methyl trimethoxysilane and phenyl trimethoxysilane are particularly preferred.

To produce the graft polymers suitable as component C), the rubber bases are grafted by standard methods. Emulsion graft polymers in which the graft monomers are grafted onto an emulsion of the rubber bases mentioned above are preferred. Preferred graft monomers are styrene, α-methyl styrene, acrylonitrile, methyl methacrylate, $C_{1-4}$ alkyl acrylate or mixtures thereof. Particular preference is attributed to styrene and acrylonitrile in ratios by weight of 90:10 to 60:40 and to methyl methacrylate with up to 30% by weight butyl acrylate.

(For measurement of the particle diameter, see W. Scholtan and H. Lange, Kolloid-Zeitschrift für Polymere, 250 (1972), pages 787–796.)

In the graft polymerization reaction with resin-forming monomers to produce uncrosslinked graft shells, free uncrosslinked polymers are generally formed to a limited extent from these monomers in addition to the graft polymer. The quantity of this ungrafted polymer may be characterized by the degree of grafting or the graft yield and is dependent inter alia on the polymerization conditions, the composition of the graft base and the size of the particles to be grafted. The graft yield may be varied within wide limits by known process measures.

The fillers and reinforcing materials and/or additives optionally used as component D) are e.g. glass fibers or mineral fillers, such as kaolin, talcum, mica, silica flour, mineral powder, alkaline earthmetal carbonates, alkaline earth metal oxides, titanium dioxide and/or zinc sulfide as well as commonly used flame retardants and/or dyes. The products in question are commercially available.

The glass fibers in the molding compound generally have an average length of 0.1 to 0.5 mm and preferably 0.1 to 0.4 mm and a diameter in the range from 6 to 20 µm. Glass fibers of E glass are particularly preferred. To obtain better adhesion, the glass fibers may be coated with organosilanes, epoxysilanes or other polymer coatings. The mineral fillers used have mean particle diameters of less than 20 µm, preferably less than 10 µm and, in particular, from 2 to 8 µm.

In addition, the molding compounds according to the invention optionally contain 0.01 to 5% by weight and, more particularly, 1 to 2% by weight, based on A)+B)+C)+optionally D), of a tetrafluoroethylene polymer.

The polytetrafluoroethylene is preferably introduced into the molding compound in combination with the graft rubbers, as described in EP-A-166 187.

The fluorine-containing ethylene polymers, which are homogeneously distributed in the molding compound, are polymers of ethylene having a fluorine content of from about 55 to 76% by weight and preferably from 70 to 76% by weight. Examples are polytetrafluoroethylene (PTFE), tetrafluoroethylene-hexafluoroethylene copolymers or tetrafluoroethylene copolymers containing relatively small amounts (generally up to 50% by weight) of copolymerized, ethylenically unsaturated monomers. These copolymers are described, for example, by Schildknecht in "Vinyl and Related Polymers", Wiley Interscience, 1952, pages 484 to 494 and by Wall in "Fluorpolymers" Wiley Interscience, 1972. The fluorine-containing ethylene polymer must be homogeneously distributed in the molding compound and must have a particle size $d_{50}$ (number average) in the range from 0.05 to 10 µm and preferably in the range from 0.1 to 5 µm.

In addition to components A, B and C and, optionally, component D, the molding compounds according to the invention may contain typical additives and processing aids.

Typical additives, are, for example, stabilizers and oxidation retarders, stabilizers against thermal decomposition and decomposition by ultraviolet light, lubricants and mold release agents, colorants, such as dyes and pigments, powder-form fillers and reinforcing materials, plasticizers. Additives such as these are added in the usual effective quantities.

The stabilizers may be added to the thermoplastic compounds at any stage during their production. The stabilizers are preferably added at an early stage to prevent decomposition-from beginning before the compound has been protected. Stabilizers of the type in question must be compatible with the compound.

Suitable mold release agents are any known products, such as ester waxes (for example montan wax), fluorine surfactants, amide waxes, such as Rhenax, and/or oligoethylenes. Suitable plasticizers are, for example, aliphatic oligomeric polyesters (see EP 29 931 and DE 27 06 128).

The processing aids may be added to the polyesters in quantities of from 0.1 to 10% by weight, preferably in quantities of from 0.3 to 5% by weight and more preferably in quantities of from 0.4 to 2% by weight.

The mixtures according to the invention may be prepared in standard mixing units, such as mixing rolls, kneaders, single-screw and multiple-screw extruders. The processing aids may be added as concentrates in thermoplastic polyester, in granulate form or as a powder mixture during compounding of the components. The temperature method corresponds to the typical conditions for polyesters.

The components to be used in accordance with the invention may be directly used as a physical mixture, for example in conventional injection molding processes, without preliminary melt compounding.

The process used to produce the compounds may be carried out both discontinuously and also continuously under conditions which largely preclude oxidation, i.e. in an inert gas atmosphere. Suitable inert gases are, for example, nitrogen, carbon dioxide and/or argon.

The polymer mixtures may optionally be subjected to a thermal aftertreatment, for example at 100° to 220° C. and preferably at 180° to 210° C.

The thermoplastic granulates according to the invention are processed to moldings at the usual processing temperatures and with the usual melt times of up to 9 minutes (1 to 9 minutes). The processing conditions for the preferred polyester molding compounds are characterized by melt temperatures of no higher than 320° C. and by melt times of no longer than 9 minutes.

The molding compounds according to the invention may be used in the production of moldings, semi-finished products or films. The moldings produced therefrom are used, for example, in the automotive field.

EXAMPLES

1. Graft Rubber Components 1.1 Graft polymer prepared by aqueous emulsion graft polymerization of 20 parts by weight of a mixture of 90 parts by weight methyl methacrylate and 10 parts by weight butyl acrylate on 80 parts by weight of a polybutadiene rubber base having an average particle diameter ($d_{50}$ value) of 380 nm and a gel content of 92% by weight.

1.2 Graft polymer prepared by aqueous emulsion graft polymerization of 30 parts by weight of a mixture of 72 parts by weight styrene and 28 parts by weight acrylonitrile on 70 parts by weight of an acrylate rubber base consisting of 0.8 part by weight of a polybutadiene core and 99.2 parts by weight of a shell of butyl acrylate polymer crosslinked with triallyl cyanurate having an average particle diameter of 480 nm ($d_{50}$ value) and a gel content of 91% by weight. 2. Polyethylene Terephthalate (PETP) Containing 3% $BaSO_4$:

a) Preparation of the barium sulfate having a chemoreactive surface, component B1):

a1) To prepare a barium sulfate having a chemoreactive surface (component B1)), a barium chloride solution was reacted with stirring with a sodium sulfate solution in a precipitation cell. Before the reaction, the $Na_2SO_4$ solution (density 1.088 g/ml) was alkalized with 7 g sodium hydroxide per liter $Na_2SO_4$ solution, followed by the addition of 32 g $Na_2SiO_3$ solution (density 1.346 g/ml) per liter sulfate solution. 105.7 ml/min $BaCl_2$ solution (density 1.073 g/ml) and 896 ml/min of the silicate-containing $Na_2SO_4$ solution were passed through the apparatus. The precipitate was filtered off, washed repeatedly with water and dried at 110° C. Wet-chemical analysis of the dry product revealed an $SiO_2$ content of 0.62%. The BET surface of the product was 18.3 m²/g.

b1) To modify the surface of a silicate-containing barium sulfate prepared in accordance with a) with a vinyl group, the barium sulfate was dispersed in anhydrous isopropanol (solids content 10% by weight). A 1% solution of vinyl trimethoxysilane in anhydrous isopropanol was added dropwise with stirring in such a quantity that the suspension contained 0.5% by weight of the silane, based on the pigment. The dispersion was stirred for about 1 hour at about 40° C. and then filtered. The unused physisorptively bound silane was then washed out of the solid with anhydrous isopropanol and the solid subsequently dried. A $BaSO_4$ on which the vinyl group could be detected by IR spectroscopy was obtained.

c) A polyethylene terephthalate having an intrinsic viscosity of 0.64 dl/g, as measured in o-dichlorobenzene/phenol (1:1) at 25° C., was used as the PETP component. Mixing was carried out in the usual way in a screw extruder.

3. Production and testing of the molding compounds according to the invention and comparison molding compounds The components shown in the Examples are compounded in a twin-screw extruder at a melt temperature of 280° C. and then injection molded to form test specimens (mold temperature 80° C., in Example 3 100° C.).

Example 1

|  | A | B |
| --- | --- | --- |
| PETP T 86[1] | 78.9 | — |
| PETP 3% $BaSO_4$ | — | 78.9 |
| Rubber (1.1) and 7% by weight Adimoll BO[2] | 20 | 20 |
| Typical additives[3] | 1.1 | 1.1 |
| Vicat B [°C.] | 96/97 | 128–132 |
| E modulus in bending [MPa] | 1600 | 1790 |

Example 2

|  | A | B |
| --- | --- | --- |
| PETP T 86[1] | 84.5 | — |
| PETP 3% $BaSO_4$ | — | 84.5 |
| Rubber (1.2) | 14 | 14 |
| Typical additives[3] | 1.5 | 1.5 |
| Vicat B [°C.] | 107/8 | 144/5 |

Example 3

|  | A | B |
| --- | --- | --- |
| PETP T 86[1] | 61 | — |
| PETP 3% $BaSO_4$ | — | 61 |
| Rubber (1.2) | 17.5 | 17.5 |
| Glass fibers[4] | 20 | 20 |
| Typical additives[3] | 1.5 | 1.5 |
| Vicat B [°C.] | 174 | 190 |
| E modulus in bending [MPa] | 4700 | 5560 |

[1] Product of Hoechst AG
[2] Plasticizer, product of Bayer AG
[3] Stabilizers, mold release agents: ester wax: Microtalk MVR: Stabaxol (15%) (0.4:0:0.7/Example 1) (0.3:0.5:0.7/Examples 2 and 3)
[4] Type 429 YZ, a product of OCF Examples 1 to 3 shown that the Vicat B value and also the elasticity modulus in bending of the molding compounds according to the invention are distinctly increased by comparison with the prior art (always Example A). The Vicat B value (120) was measured in accordance with DIN 53 460 and the modulus of elasticity in bending in accordance with DIN 53 457-B3.

We claim:
1. Thermoplastic molding compounds of
A) 1 to 99 parts by weight polyalkylene terephthalate,
B) 0.1 to 15 parts by weight barium sulfate having a chemoreactive surface produced by precipitation of barium ions with sulfate ions in aqueous medium in the presence of additional anions of water soluble compounds which can be precipitated with barium ions and form sparingly soluble barium compounds, the chemoreactive barium sulfate obtained, optionally aftertreated with coupling gents, having particle sizes of <0.1 μm, 80 to 5 m²/g (BET)
C) 1 to 35 parts by weight of a particulate graft polymer of 35 to 95 parts by weight of an at least partly crosslinked rubber base of olefin, diene, acrylate and/or silicone rubbers grafted with 5 to 65 parts by weight vinyl monomers selected from styrenes, α-methyl styrenes, acrylonitrile, methacrylonitrile, $C_{1-8}$ alkyl (meth)acrylate, $C_{1-4}$ carboxylic acid vinyl ester, maleic anhydride, maleic acid imides, maleic acid semiesters, (meth)acrylates containing reactive groups in the alcohol radical or mixtures thereof and optionally,
D) 0.1 to 50 parts by weight, based on components A), B) and C), or fillers and/or reinforcing materials and/or flame retardant agents,
with the proviso that components A) to D) add up to 100 parts by weight.

2. Thermoplastic molding compounds as claimed in claim 1, characterized in that they contain 15 to 94.9 parts by weight component A), 0.1 to 10 parts by weight component B), 5 to 30 parts by weight component C) and, optionally, 0.1 to 45 parts by weight component D).

3. Thermoplastic molding compounds as claimed in claim 1, characterized in that they contain 20 to 94.9 parts by weight component A), 0.1 to 10 parts by weight component B), 5 to 30 parts by weight component C) and, optionally, 0.1 to 40 parts by weight component D).

4. Moldings, films and semi-finished products which comprise the molding compounds claimed in claim 1.

* * * * *